United States Patent
Genty et al.

(10) Patent No.: US 11,173,474 B2
(45) Date of Patent: Nov. 16, 2021

(54) CATALYSATOR ELEMENT COMPRISED OF A MIXED METAL OXIDE HYDROTALCITE-LIKE COMPOUND

(71) Applicant: BOSAL EMISSION CONTROL SYSTEMS NV, Lummen (BE)

(72) Inventors: Eric Genty, Lummen (BE); Dulgheru Petrica, Lummen (BE); Thiery Visart De Bocarme, Lummen (BE)

(73) Assignee: BOSAL EMISSION CONTROL SYSTEMS NV, Lummen (BE)

( * ) Notice: Subject to any disclaimer, the term of this patent is extended or adjusted under 35 U.S.C. 154(b) by 1 day.

(21) Appl. No.: 16/629,102

(22) PCT Filed: Jul. 5, 2018

(86) PCT No.: PCT/EP2018/068275
§ 371 (c)(1),
(2) Date: Jan. 7, 2020

(87) PCT Pub. No.: WO2019/011782
PCT Pub. Date: Jan. 17, 2019

(65) Prior Publication Data
US 2020/0164347 A1    May 28, 2020

(30) Foreign Application Priority Data

Jul. 10, 2017 (EP) .................................. 17180530

(51) Int. Cl.
| | | |
|---|---|---|
| *B01J 23/83* | (2006.01) | |
| *B01J 35/10* | (2006.01) | |
| *B01J 37/04* | (2006.01) | |
| *B01J 37/03* | (2006.01) | |
| *B01J 37/02* | (2006.01) | |
| *B01J 37/08* | (2006.01) | |
| *B01D 53/94* | (2006.01) | |

(52) U.S. Cl.
CPC .......... *B01J 23/83* (2013.01); *B01D 53/9418* (2013.01); *B01J 35/1014* (2013.01); *B01J 35/1061* (2013.01); *B01J 37/0236* (2013.01); *B01J 37/031* (2013.01); *B01J 37/04* (2013.01); *B01J 37/088* (2013.01); *B01D 2255/2065* (2013.01); *B01D 2255/2092* (2013.01); *B01D 2255/20746* (2013.01); *B01D 2255/40* (2013.01)

(58) Field of Classification Search
CPC .. B01D 53/56; B01D 53/565; B01D 53/9418; B01D 53/9431; B01D 2251/2067; B01D 2255/40; B01D 2257/402; B01D 2257/404; B01D 2258/012; B01D 2255/102; B01J 23/002; B01J 23/40; B01J 37/00; F01N 3/2066; F01N 3/2067; F01N 2370/02; F01N 2570/14; F01N 2610/02
See application file for complete search history.

(56) References Cited

U.S. PATENT DOCUMENTS

| | | | | |
|---|---|---|---|---|
| 5,276,233 | A * | 1/1994 | Blom | ....................... B01J 23/89 585/419 |
| 9,352,303 | B2 * | 5/2016 | Chang | .................... B01J 23/002 |
| 2008/0026937 | A1 | 1/2008 | Han et al. | |
| 2011/0110835 | A9 * | 5/2011 | Nirisen | .................... B01J 23/83 423/237 |
| 2012/0219487 | A1 | 8/2012 | Chang et al. | |

FOREIGN PATENT DOCUMENTS

| | | | | |
|---|---|---|---|---|
| KR | 100654885 B1 | 11/2006 | | |
| WO | WO 2014 080 428 A1 * | 5/2014 | | .............. B01J 23/02 |

OTHER PUBLICATIONS

International Search Report and Written Opinion for the International Patent Application No. PCT/EP2018/068275, dated Oct. 2, 2018, 11 pages.

* cited by examiner

*Primary Examiner* — Timothy C Vanoy
(74) *Attorney, Agent, or Firm* — Kacvinsky Daisak Bluni PLLC

(57) ABSTRACT

A catalysator element comprising a mixed metal oxide compound for conversion of nitrogen oxides ($NO_x$). Methods for the preparation of the present mixed metal oxide compound for use in the present catalysator element and to exhaust systems for a combustion engine comprising the present catalysator element for conversion of ($NO_x$) in exhaust gasses. Specifically, a catalysator element for conversion of nitrogen oxides (NOx) comprises a solid support coated with a calcined mixed metal oxide hydrotalcite-like compound. The calcined mixed metal oxide hydrotalcite-like compound comprises at least one bivalent metal ($M^{2+}$) and at least one trivalent metal ($M^{3+}$).

22 Claims, 5 Drawing Sheets

CATALYSATOR ELEMENT COMPRISED OF A MIXED METAL OXIDE HYDROTALCITE-LIKE COMPOUND

Figure 1:
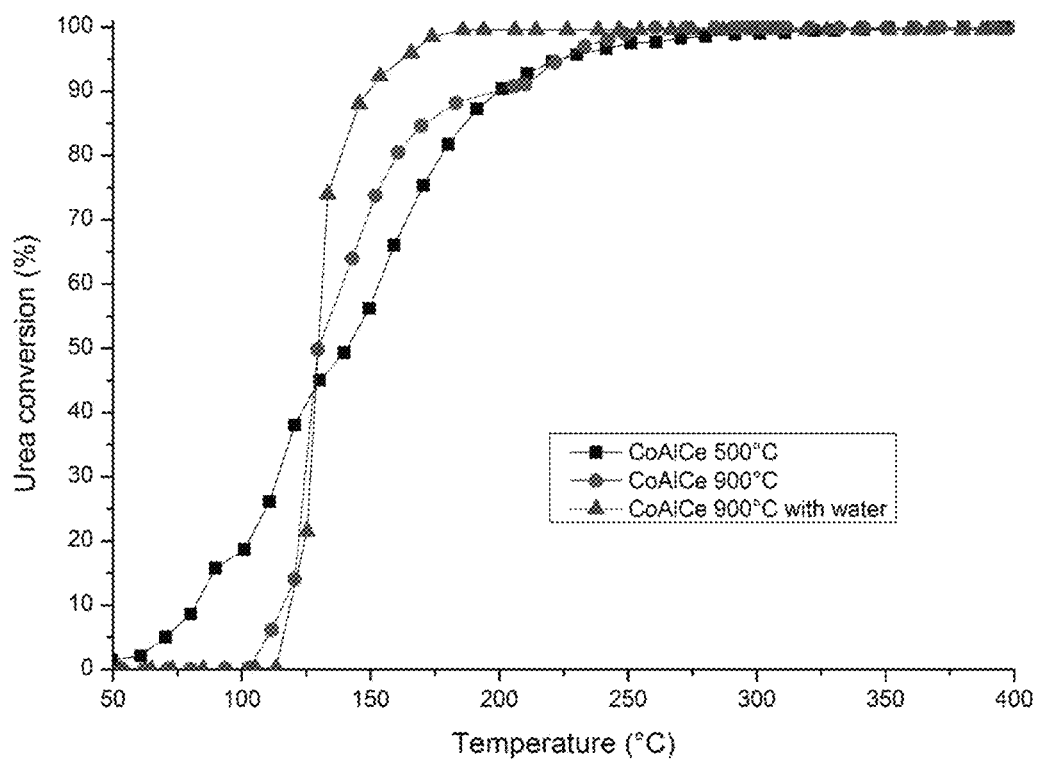

This is a national stage application filed under 35 U.S.C. § 371 of pending international application PCT/EP2018/068275, filed Jul. 5, 2018, which claims priority to European Patent application EP 17180530.2, filed Jul. 10, 2017, the entirety of which applications are hereby incorporated by reference herein.

The present invention relates to a catalysator element comprising a mixed metal oxide compound for conversion of nitrogen oxides ($NO_x$). The present invention further relates to methods for the preparation of the present mixed metal oxide compound for use in the present catalysator element and to exhaust systems for a combustion engine comprising the present catalysator element such as for conversion of ($NO_x$) in exhaust gasses.

Nitrogen oxides ($NO_x$) are produced during combustion in engines and $NO_x$ are one of the main contributors to air pollution, namely nitric oxide (NO) and nitrogen dioxide ($NO_2$). These gases contribute to the formation of for instance smog and acid rain. Pollution due to the emission by combustion engines can be reduced by the addition of so called diesel exhaust fluid (DEF) comprising urea (also known as carbamide) being an organic compound of the formula $CO(NH_2)_2$. Generally, DEF is an aqueous urea solution that is composed of 32.5% urea and 67.5% deionized water. DEF is used in combustion engines in a process known as selective catalytic reduction (SCR) to lower the $NO_x$ concentration in the gas exhaust emissions and reduce the amounts of $NO_x$ released into the atmosphere.

In the selective catalytic reduction reaction. $NO_x$ is being converted, using a SCR catalyst, into nitrogen ($N_2$) and water ($H_2O$). In the application field of combustion engines powered vehicles DEF is injected into a hot exhaust gas stream, wherein the aqueous urea vaporizes (the water evaporates). The urea is thermally decomposed to form ammonia ($NH_3$) and isocyanic acid (HNCO). Subsequently, HNCO is hydrolyzed to carbon dioxide ($CO_2$) and ammonia ($NH_3$). $NH_3$ in the presence of oxygen ($O_2$) and a SCR catalyst will reduce the $NO_x$ resulting in $N_2$ and $H_2O$ as end products. Both $N_2$ and $H_2O$ are released into the atmosphere via the gas exhaust duct of the engine.

Generally, urea comprised in DEF is injected upstream of the SCR catalyst. The spray can be injected on a mixer, pipe wall, evaporation pipe, cone etc. In commercial systems, injection is programmed to start if temperature exceeds 170° C. which is regarded as the minimum threshold to avoid formation of urea deposits. Inherently, this means that in the time required first few minutes until this temperature is reached NOx is only partially treated. In fact most of the $NO_x$ emitted at the tailpipe occurs in this period of time called "cold start".

The optimal temperature for the SCR reaction is between 350° C. and 450° C., wherein approximately 98% of the $NO_x$ is being converted. The reaction can also occur at temperatures as low as 225° C., however at such relatively low temperatures about only 50%-60% of the $NO_x$ is being converted and longer residence times are required inherently being unpractical and suboptimal for use in emission control systems for combustion engine powered vehicles.

SCR catalysts are comprised of carrier materials (mostly ceramic substrates), and active catalytic components which are most often metal oxides. For automotive purposes it is important that the SCR catalyst has a high thermal durability to operate at substantially high temperatures for prolonged periods of time. In general, SCR catalysts have a geometry of honeycomb or plate structure in order to provide for an increased reaction surface area being beneficial for the conversion reaction and total $NO_x$ conversion rate.

However, suboptimal SCR reactions (e.g. at low temperatures during DEF injection) result in that either urea is not decomposed or isocyanic acid is not efficiently hydrolyzed in $NH_3$ and lead to the formation of deposits or films of undecomposed urea and/or isocyanic acid on the interior of the exhaust gas duct. Urea starts to thermally decompose at a temperature above 132° C. This decomposition reaction is an endothermic reaction and leads to a temperature drop which is building upon the impact of water evaporation, the combination of these two effects (chemical and physical) add to the effect of formation of deposits.

Low temperatures in the exhaust duct also occur when an engine is just started and needs time to warm up or when the DEF is injected into the gas exhaust duct which may lead to an drop in the temperature to 60° C.-70° C. At such low temperatures, the formation of urea/HNCO depositions is induced. In time, these depositions are clogging the components of the exhaust system resulting in an obstruction of the gas flow inherently affecting flow uniformity on the catalyst surface), increased backpressure, decreased SCR reaction and in a decreased or even absent reduction of $NO_x$ in exhaust gases, as well as impacting the calibration of urea injection with negative impacts on the amount of $NH_3$ slip.

Further problems associated with deposits formation is that deposits can be difficult to decompose if they polymerize to high chain even if temperatures are higher than 250° C.

Considering the above, there is a need in the art for an improved catalysator element wherein the formation of urea deposits in the gas exhaust system is reduced or prevented and thereby improving the $NO_x$ reduction in exhaust gasses. Furthermore, there is a need in the art for a more efficient (e.g. higher conversion and at lower temperatures) and more durable $NO_x$ reduction in the gas exhaust systems of combustion engines.

It is an object of the present invention, amongst other objects, to address the above need in the art. The object of present invention, amongst other objects, is met by the present invention as outlined in the appended claims.

Specifically, the above object, amongst other objects, is met, according to a first aspect, by the present invention by a catalysator element suitable for conversion or nitrogen oxides ($NO_x$) comprised of a solid support coated with a calcined mixed metal oxide hydrotalcite-like compound, wherein said calcined mixed metal oxide hydrotalcite-like compound comprises at least one bivalent metal ($M^{2+}$) and at least one trivalent metal ($M^{3+}$), wherein:
  said at least one bivalent metal ($M^{2+}$) is selected from the group consisting of $Co^{2+}$, $Cu^{2+}$, $Fe^{2+}$, $Mn^{2+}$, $Zn^{2+}$, $Ni^{2+}$, $Ag^{2+}$, $Ca^{2+}$, $Pt^{2+}$; $Pd^{2+}$; $Cd^{2+}$; $Mo^{2+}$; $W^{2+}$; $Ru^{2+}$; $Sr^{2+}$; $Ba^{2+}$; $Nd^{2+}$ and mixtures thereof, preferably $Co^{2+}$; and
  wherein said at least one trivalent metal ($M^{3+}$) is selected from the group consisting of $Ce^{3+}$, $Al^{3+}$, $Mn^{3+}$, $Fe^{3+}$, $Hf^{3+}$, $Co^{3+}$, $V^{3+}$, $Ti^{3+}$, $Zr^{3+}$, $Y^{3+}$, $La^{3+}$ and $Pr^{3+}$ and mixtures thereof, preferably $Ce^{3+}$ and $Al^{3+}$; or
  wherein said at least one trivalent metal ($M^{3+}$) in combination with $Al^{3+}$ is selected from the group consisting of $Ce^{3+}$, $Mn^{3+}$, $Fe^{3+}$, $Hf^{3+}$, $Co^{3+}$, $V^{3+}$, $Ti^{3+}$, $Zr^{3+}$, $Y^{3+}$, $La^{3+}$ and $Pr^{3+}$ and mixtures thereof, preferably $Ce^{3+}$.

Regarding $Pt^{2+}$, $Pd^{2+}$, it is noted that these bivalent metals provide excellent hydrolysis catalysis especially in low temperature conditions. With respect to oxidation catalysis, especially at temperatures over 200° C. dispersing them into a hydrotalcite matrix we will be decreasing their overall ability to oxidise while maintaining the activity in hydrolysis reaction. The efficiency of these two bivalent metals can be suitably exploited by adding platinum and/or palladium in combination with the above other bivalent metals, i.e. platinum and or palladium doped in, for example CoAlCe, although doping in other bivalent metal and trivalent metal combinations such as those listed below are also envisaged.

Surprisingly, the present inventors have found that mixed metal oxides, such as transition metal oxides, being produced as hydrotalcite-like compound have a tuneable and moderate acidic character required by hydrolysis reactions, specifically in urea decomposition and HCNO hydrolysis, which are very relevant in SCR applications used in automotive exhaust gas treatment. Hydrotalcite is a layered double hydroxide and comprise a class of layered materials with unique structural properties. Hydrotalcites are composed of positively charged hydroxide layers and mobile anions and water molecules located in the interlayer region. Compounds adopting this unique structure are often referred to as hydrotalcite-like compounds. Hydrotalcite-like compounds are very homogeneous which allow an optimum density of acid sites required for hydrolysis reactions (such as isocyanic acid hydrolysis). The layered double hydroxides structure gives these compounds anion-exchange properties suitable for several industrial applications, including the development of new pharmaceuticals and catalysts.

The present inventors have found that mixed metal oxides being produced as hydrotalcite-like compound can accelerate the rate of urea decomposition to form $NH_3$ at temperatures below 150° C. by catalyzing the isocyanic acid hydrolysis. Furthermore, when a part of the exhaust gas duct, urea injector housing, urea mixing element or inlet face of the urea SCR brick is being provided with these mixed metal oxides hydrotalcite-like compounds, urea deposits (such as biuret, triuret, melamine, ammelide and cyanuric acid) are decomposed at temperature below 170° C. It is noted that diesel vehicles are generally not injecting urea even if required by legislation if the temperature if below 170° C. to prevent the formation of deposits.

Most elements present in the gas exhaust duct of a combustion engine may be provided with a coating of present calcined mixed metal oxide hydrotalcite-like compound, such as a coated urea injector housing, a coated urea mixing element, a coated inlet interface of an urea selective catalytic reduction catalyst, a coated mixing duct, a coated evaporation duct, a coated catalytic converter, preferably a coated urea injector housing, more preferably a coated urea mixing element, most preferably a coated inlet interface.

Similar mixed metal oxide compounds can be produced via incipient wetness impregnation (IWI), however these mixed metal oxides are lacking the hydrotalcite like structure and the chemical properties due to this specific structure. In incipient wetness impregnation (IWI) the metal nitrites are added over a support, for example gamma alumina, capillary action draws the solution into the pores of the support, followed by drying at 110° C. and calcination at 400° C. However due to the different methods of production (IWI method versus hydrotalcite method), the compounds have very different properties and structure. For instance using IWI, the mixed metal oxide compounds would have a surface area close to the surface area of the starting support (i.e. gamma alumina). Furthermore, the IWI produced mixed metal oxide compounds would only contain supported oxides, and maybe traces of carbonates. Furthermore the composition homogeneity and uniform particle size of the mixed metal oxide compound will be less as compared to the composition produced via the hydrotalcite method. This means that there is a reduced chemical interaction between the metals, e.g. cobalt, alumina and ceria. Furthermore, exposing the mixed metal oxides obtained in the IWI method to temperatures over 900° C. would result in the development of chemical interactions and the appearance of $CoAl_2O_4$, caused by sintering and $Co_xAl_yCe_z$ materials and will result in a dramatic loss in surface area. In contrast, results show that the metal oxide compounds produced via the hydrotalcite method of the present invention have an increased sintering resistance when exposed at a temperature of more than 900° C. for 12 h, wherein the catalytic surface area remains at least 70 $m^2/g$, preferably at least 80 $m^2/g$. Although the IWI produced mixed metal oxide compounds are also active in urea decomposition because of the moderate acidic character of the oxides, they are less active than the mixed metal oxide compounds of present invention produced via a hydrotalcite method.

The calcined mixed metal oxide hydrotalcite-like compound can be used in the gas exhaust duct as described earlier for the prevention or reduction of urea solid deposition in the gas exhaust duct of a combustion engine. This in turn results in the prevention or reduction of NOx emissions from a combustion engine. The calcined mixed metal oxide hydrotalcite-like compound of present invention, when present in the gas exhaust duct of combustion engines increases the efficiency of $NO_x$ after treatment, especially in the low temperature regime (<120° C.). Usually urea is injected in the gas exhaust duct of combustion engines at temperatures exceeding 170° C. Further experiments have shown that the injection of urea causes significant temperature drops in the exhaust duct, dropping the temperature to 60° C.-70° C., resulting in the formation of urea depositions. However when urea injection was stopped and the temperature in the exhaust duct exceeded over about 130° C., a catalytic coating comprised of the mixed metal oxide hydrotalcite-like compound of present invention would decompose the urea depositions present (about 7 grams) in less than 4 minutes without further polymerization. These results indicate that the mixed metal oxide compound of present invention has "self-cleaning characteristics" and can overcome the urea depositions present in the gas exhaust duct that were formed at low temperatures (e.g. when a combustion engine is started).

Present invention provides a solution to inject urea at temperatures lower than 170° C. and as low as 100° C. and allows for vehicle manufacturers to start the treatment of the exhaust gases 60-120 seconds earlier (e.g. at the start of engines) without having the problem of urea deposition formation in the exhaust duct resulting in a reduced $NO_x$ treatment. Besides this, assuming urea deposits have formed (e.g. due to high urea dosage for an extended period of time) the catalytic coating of calcined nixed metal oxide hydrotalcite-like compound has a self-cleaning property which allows urea deposits to decompose if urea spray is stopped and the temperature exceeds 150° C. Due to this self-cleaning properties, gas ducts can stay free of urea deposits and maintain a low backpressure during operation but also avoid the persistence of urea deposits which can influence the flow uniformity and in turn influence the $NO_x$ reduction and ammonia slip.

The present calcined mixed metal oxide hydrotalcite-like compound is preferably Catalysator element according to claim 1, wherein at least one bivalent metal ($M^{2+}$) and said at least one trivalent metal ($M^{3+}$) are selected from the group of non-stoichiometric combinations consisting of CoAlCe;

CoAlMn; CoAlFe; CoAlCo; CoAlV; CoAlTi; CoAlHf; CoAlPr; CoAlLa; CuAlCe; FeAlCe; ZnAlCe; NiAlCe; AgAlCe; CaAlCe; PtAlCe; PdAlCe; CdAlCe; MoAlCe; WAlCe; RuAlCe; SrAlCe; BaAlCe; NdAlCe; CuAlMn; FeAlMn; ZnAlMn; NiAlMn; AgAlMn; CaAlMn; PtAlMn; PdAlMn; CdAlMn; MoAlMn; WAlMn; RuAlMn; SrAlMn; BaAlMn; NdAlMn; CuAlFe; FeAlFe; ZnAlFe; NiAlCe; AgAlCe; CaAlCe; PtAlCe; PdAlCe; CdAlCe; MoAlCe; WAlCe; RuAlCe; SrAlCe; BaAlCe; NdAlCe; CuAlCo; FeAlCo; ZnAlCo; NiAlCo; AgAlCo; CaAlCo; PtAlCo; PdAlCo; CdAlCo; MoAlCo; WAlCo; RuAlCo; SrAlCo; BaAlCo; NdAlCo; CuAlV; FcAlV; ZnAlV; NiAlV; AgAlV; CaAlV; PtAlV; PdAlV; CdAlV; MoAlV; WAlV; RuAlV; SrAlV; BaAlV; NdAlV; CuAlTi; FeAlTi; ZnAlTi; NiAlTi; AgAlTi; CaAlTi; PtAlTi; PdAlTi; CdAlTi; MoAlTi; WAlTi; RuAlTi; SrAlTi; BaAlTi; NdAlTi; CuAlHf; FeAlHf; ZnAlHf; NiAlHf; AgAlHf; CaAlHf; PtAlHf; PdAlHf; CdAlHf; MoAlHf; WAlHf; RuAlHf; SrAlHf; BaAlHf; NdAlHf; CuAlPr; FeAlPr; ZnAlPr; NiAlPr; AgAlPr; CaAlPr; PtAlPr; PdAlPr; CdAlPr; MoAlPr; WAlPr; RuAlPr; SrAlPr; BaAlPr; NdAlPr; CuAlLa; FeAlLa; ZnAlLa; NiAlLa; AgAlLa; CaAlLa; PtAlLa; PdAlLa; CdAlLa; MoAlLa; WAlLa; RuAlLa; SrAlLa; BaAlLa; and NdAlLa; and NdAlLa or from the group of non-stoichiometric consisting of CoAlCe; CoAlMn; CoAlFe; CoAlCo; CoAlV; CoAlTi; CoAlPr; CoAlLa; CuAlCe; FeAlCe; ZnAlCe; NiAlCe; AgAlCe; CaAlCe; PtAlCe; PdAlCe; CdAlCe; MoAlCe; RuAlCe; SrAlCe; BaAlCe; NdAlCe; PdAlMn; RuAlMn; CdAlCe; MoAlCe; WAlCe; RuAlCe; CuAlCo; FeAlCo; ZnAlCo; NiAlCo; CdAlCo; MoAlCo; WAlCo; RuAlCo; NdAlCo; CuAlPr; FeAlPr; NiAlPr; AgAlPr; CaAlPr; CdAlPr; CuAlLa; FeAlLa; NiAlLa; AgAlLa; CaAlLa; CdAlLa; MoAlLa; WAlLa; SrAlLa; BaAlLa; and NdAlLa.

According to a preferred embodiment, the present invention relates to the catalysator element, wherein the calcined mixed metal oxide hydrotalcite-like compound is obtained by calcining a mixed metal oxide hydrotalcite-like compound comprising at least one bivalent metal ($M^{2+}$) and at least one trivalent metal ($M^{3+}$) at a temperature of between 200° C. to 600° C., preferably between 300° C. to 500° C., more preferably at 450° C., for at least 1 hours, preferably 5 hours.

According to another preferred embodiment, the present invention relates to the catalysator element, wherein the sold support is a metallic support or a ceramic support either zone coated or fully coating with the catalysator element, preferably a solid support selected from the group consisting of metal wiremesh; corrugated metal plates forming a metal substrate; ceramic mixers or other ceramic components guiding or influencing the flow; ceramic substrates; SCR catalyst substrate; SCRF substrate, i.e. a SCR catalyst and particulate filter combined on a single ceramic substrate; DPNR, i.e. a Diesel particulate NOx reduction catalyst substrate.

According to yet another preferred embodiment, the present invention relates to a catalysator element, wherein the catalysator element provides conversion of isocyanic acid to $NH_3$ via hydrolysis and/or conversion of urea to $NH_3$.

According to another preferred embodiment, the present invention relates to the catalysator element comprised in an exhaust system of a combustion engine or comprised in a system that guides exhaust gases of a combustion engine.

According to yet another preferred embodiment, the present invention relates to the catalysator element, wherein the calcined mixed metal oxide hydrotalcite-like compound has a catalytic surface area of at least 80 $m^2/g$, preferably at least 100 $m^2/g$, most preferably at least 120 $m^2/g$.

According to a preferred embodiment, the present invention relates to the catalysator element, wherein the calcined mixed metal oxide hydrotalcite-like compound has an average pore diameter of at least 4 nm, preferably at least 5 nm, most preferably at least 6 nm.

According to a preferred embodiment, the present invention relates to the catalysator element, wherein the at least one bivalent metal ($M^{2+}$) has an atomic radius ranging from 0.3 Å A and 1.05 Å, and wherein the at least one trivalent metal ($M^{3+}$) has an atomic radius ranging from 0.5 Å and 1.1 Å.

According to another preferred embodiment, the present invention relates to the catalysator element, wherein the calcined mixed metal oxide hydrotalcite-like compound has a urea to $NH_3$ conversion rate of at least 50% at a temperature below 125° C., preferably of at least 90% at a temperature below 180° C. The mixed metal oxide hydrotalcite-like compound of present invention demonstrate urea conversion to $NH_3$ at low temperatures, about 10% urea conversion at 65° C., 50% urea conversion at 125° C. and 90% urea conversion at 185° C. The mixed metal oxide hydrotalcite-like compound is able to prevent urea deposit formation via fast hydrolysis of isocyanic acid at temperatures as low as of around 120° C. Result have shown that when DEF is injected (45 ml) over an urea mixer that was provided with the mixed metal oxide compound of present invention (i.e. $Co_6Ce_{0.8}Al_{1.2}O_{12}$) at 120° C., only 0.03 grams of urea solid deposits were formed as opposed to more than 8 grams of deposit formed on a non-coated mixer.

According to yet another preferred embodiment, the present invention relates to the catalysator element, wherein the calcined mixed metal oxide hydrotalcite-like compound has a total metal wt % ratio of $M^{2+}:M^{3+}$ of between 0.05 and 0.8, preferably between 0.1 and 0.7, more preferably between 0.2 and 0.6.

According to another preferred embodiment, the present invention relates to the catalysator element, wherein the calcined mixed metal oxide hydrotalcite-like compound is comprised of a total metal wt % between 50 to 90 wt % of $Co^{2+}$, 4 to 30 wt % of $Ce^{3+}$ and 2 to 30 wt % of $Al^{3+}$, preferably between 65 to 75 wt % of $Co^{2+}$, 17 to 25 wt % of $Ce^{3+}$ and 4 to 10 wt % of $Al^{3+}$.

According to a preferred embodiment, the present invention relates to the catalysator element, wherein the calcined mixed metal oxide hydrotalcite-like compound is $Co_6Ce_{0.8}Al_{1.2}O_9$.

The present invention, according to a second aspect, relates to a method for the preparation of a calcined mixed metal oxide hydrotalcite-like compound for use in the catalysator element of present invention, wherein the method comprises the steps of:
  a) mixing of at least one bivalent metal nitrite ($M^{2+}(NO_3)_x$) with at least one trivalent metal nitrite ($M^{3+}(NO_3)_x$) in an ammonium carbonate solution ($NH_4CO_3$).
  b) precipitating a mixed metal oxide hydrotalcite-like compound from the mixture,
  c) recovering the mixed metal oxide hydrotalcite-like compound by drying, and
  d) calcining the dried mixed metal oxide hydrotalcite-like compound at between 200° C. to 600° C., preferably between 300° C. and 500° C., preferably 400° C. or 450° C., for at least 1 hours, preferably 5 hours.

Due to the calcining step the catalytic surface area of the mixed metal oxide hydrotalcite-like compound is increased to at least 80 m²/g, preferably at least 100 m²/g, most preferably at least 120 m²/g.

In step (c) of the method of present invention, a drying step of the recovered mixed metal oxide hydrotalcite-like compound is suitably performed at a temperature of between 80° C. to 120° C., preferably 100° C. to 110° C. for at least 12 hours, preferably for at least 16 hours. Precipitation in step b is performed at a temperature between 20° C. to 80° C., preferably between 45° C. to 65° C. and at a pH of between about 9 to 11, preferably at a pH of between about 9.5 to 10.5.

According to a preferred embodiment, the present invention relates to the method, wherein the calcined mixed metal oxide hydrotalcite-like compound is $Co_6Ce_{0.8}Al_{0.2}O_9$.

The present invention, according to a third aspect, relates to a calcined mixed metal oxide hydrotalcite-like compound obtainable by the method of present invention.

The present invention, according to a forth aspect, relates to an exhaust system for a combustion engine comprising a catalysator element of the present invention.

The present invention, according to a further aspect, relates to methods for
- conversion of nitrogen oxides (NOx) in exhaust gasses comprising contacting said exhaust gasses with the present catalysator element during a sufficient time for allowing catalytic conversion of nitrogen oxides (NOx) comprising contacting urea with the catalysator element to generate NH3, followed by reduction of NOx with $NH_3$ over a SCR catalysator element;
- prevention of the formation of deposits including cyanuric acid downstream of an SCR or an SCRF including in the low pressure EGR comprising contacting isocyanic acid with the present catalysator element upstream of the low pressure EGR, thereby preventing the formation of cyanuric acid;
- conversion of urea $(NH_2)_2CO$ into ammonia $(NH_3)$ comprising contacting said urea with the present catalysator element during a sufficient time for allowing catalytic conversion of urea into ammonia.
- decomposing urea deposits in an exhaust system by contacting the deposits with the present catalysator element and by increasing the temperature over 140° C., preferably over 200° C.

Figure 2:
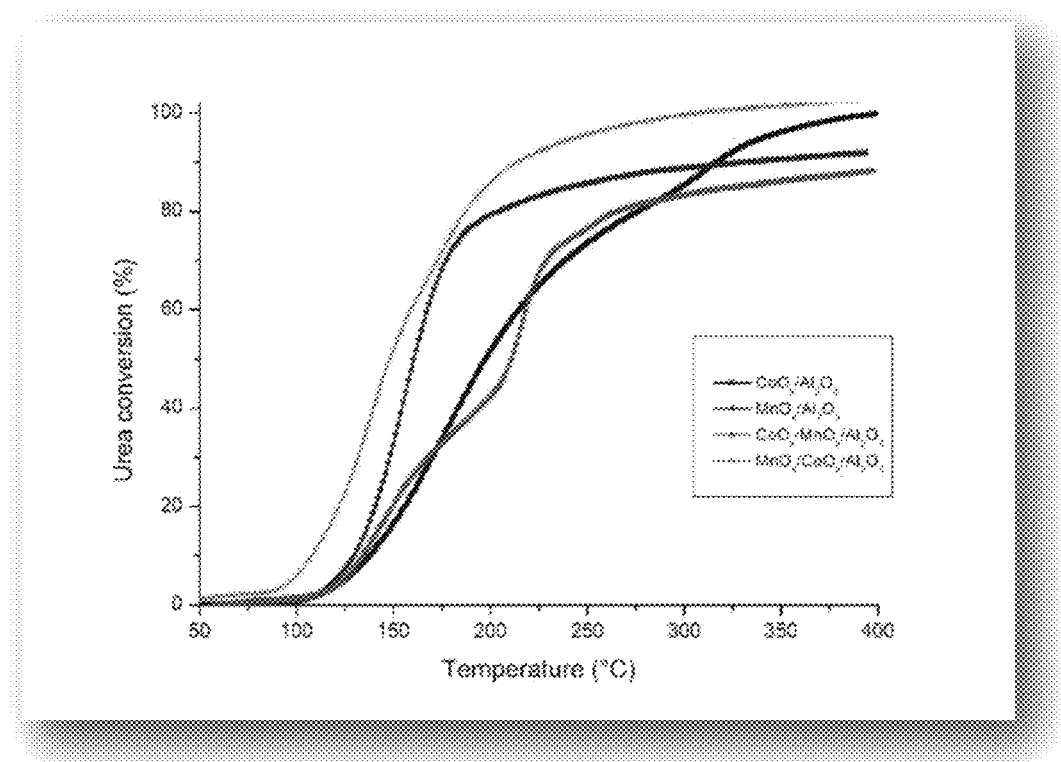
Figure 3:
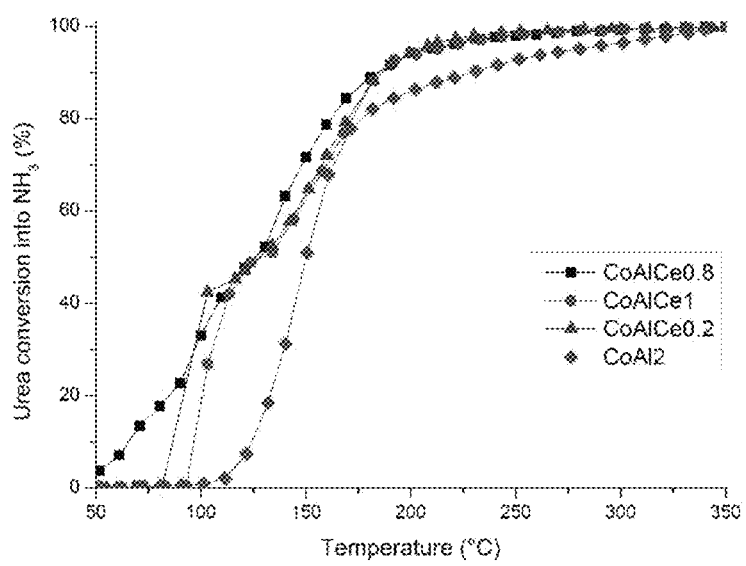
Figure 4:
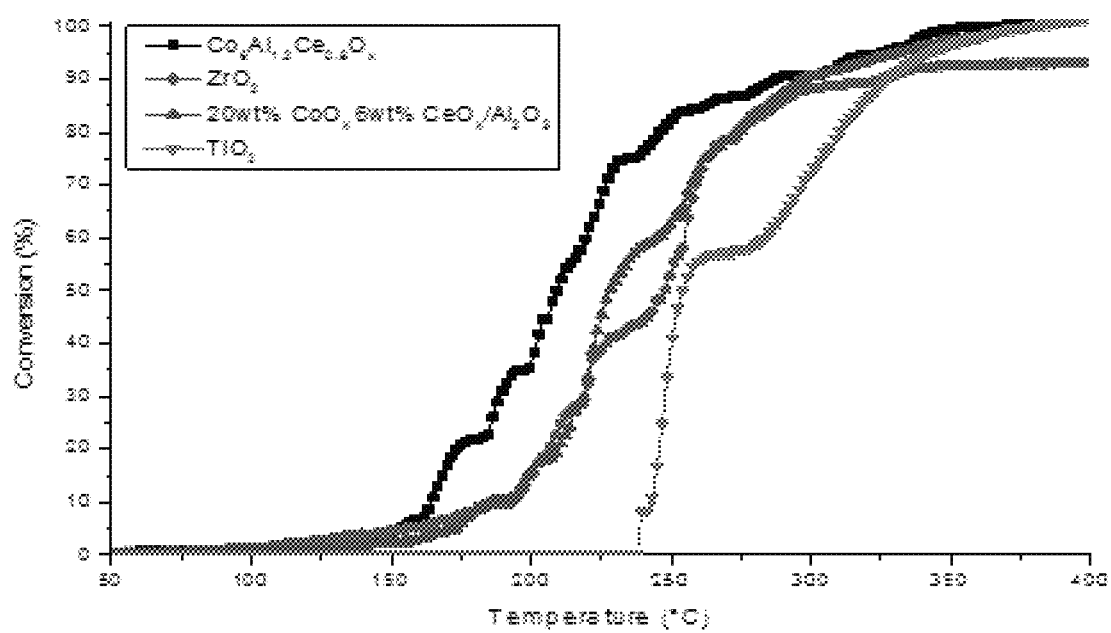
Figure 5:
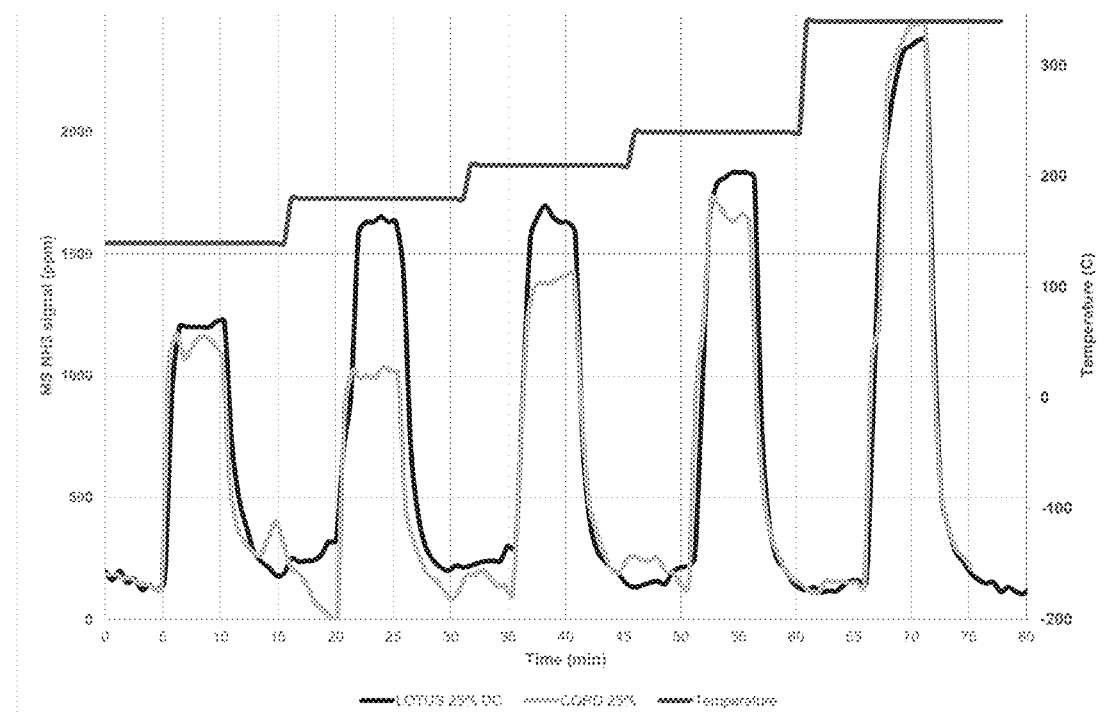

The present invention will be further detailed in the following examples and figures wherein:

FIG. 1: shows that the impact of exposure to high temperatures is beneficial;

FIG. 2: shows urea conversion experiments of materials produced via incipient wetness impregnation;

FIG. 3: shows urea conversion experiments of materials produced via hydrotalcite method;

FIG. 4: shows decomposition of cyanuric acid with a series of catalysts;

FIG. 5: shows a comparison between ureum conversion following adblue injection at temperatures between 140° and 340° C. over a cordierite core (light green line) and lotus ($Co_6Ce_{0.8}Al_{1.2}O_9$) coated cordierite core (black line).

EXAMPLES

Example 1: Preparation of $Co_6Ce_{0.8}Al_{1.2}O_9$ Using the Hydrotalcite Method Hydrotalcites were prepared by a co-precipitation method by mixing specific amounts of the metal nitrates (i.e. cobalt nitrate, ceria nitrate, alumina nitrate) with a $NH_4CO_3$ solution at a pH of 10.5. Metal nitrates were mixed at 60° C. The precipitate was recovered and dried at 110° C. for 24 hours. The resulting material is a cobalt ceria alumina hydrotalcites like compound (laminar hydroxides). The catalytic surface area of the produced cobalt ceria alumina hydrotalcites like compound was 80 m²/g.

After drying, the cobalt ceria aluminium hydrotalcites are placed in a furnace at 400 to 500° C. (calcined) for 5 hours to decompose the lamellar, hydrotalcite structure and allow the departure of the $CO_3^{2-}$ and $NO^{3-}$ anions creating a stable metal oxide compound, $Co_6Ce_{0.8}Al_{1.2}O_9$. This compound had a particle size of 8.6 Å as measured by X Ray Diffraction (using Scherrer equation) and Transmission Electron Microscopy and an average pore diameter of 5.59 nm as measured with $N_2$ BET. Furthermore, the catalytic surface area was increased to approximately 120 m²/g, due to escaping gases which create porosity in the compound structure.

Surprisingly, results furthermore show that additional calcining the materials at 900° C. for 12 hours only had a minor impact on catalytic surface area decreasing it about 84 m²/g in dry atmosphere and 75 m²/g in presence of water from 123 m²/g recorded on materials calcined at 500° C.

This is an indication that the materials should be able to survive high temperature exposure observed even during DPF uncontrolled regeneration.

TABLE 1

Physical characteristics of powders exposed to high temperatures in presence and absence of water versus samples calcined at 500° C.

| Sample name | $S_{BET}$ (m²/g) | Pore Volume (cm³/g) | Average pore diameter (nm) |
|---|---|---|---|
| CoAlCeHT calcined at 500° C. | 123 | 0.62 | 5.6 |
| CoAlCeHT calcined at 900° C. | 84 | 0.56 | 27.2 |
| CoAlCeHT calcined at 900° C. with $H_2O$ | 78 | 0.48 | 33.3 |

Example 2

Referring to FIG. 4, uncatalysed decomposition occurs over 270° C., a temperature much higher than the one that can be generated in LP EGR conditions. Equipment: in situ DRIFTS+MS, Test condition: 50 mg catalyst, 10 mg cyanuric acid impregnated at RT, Temperature ramped from 50-400° C. with 2 degr/min in a flow of 20 mL/min of 10% O2/Ar, According the $T_{50}$: Co6Al1.2Ce0.8Ox>20 wt % CoOx 6 wt % CeOx/Al2O3>ZrO2>TiO2

Example 3

Referring to FIG. 5, experimental conditions: 158 kg/h exhaust flow, adblue injection 820 g/h, dosing frequency: 4 Hz, Duty cycle 25%, dosing time: 300 s. The experiment starts with adblue injection=0 g/h for 300 s followed by adblue injection for 300 s. Temperature was generated using a Leister electric furnace 32 Kw, adblue injection was generated using a DeNOxtronic 3.0 (Bosch).

The invention claimed is:

1. A catalysator element, comprising:
   a solid support coated with a calcined mixed metal oxide hydrotalcite-like compound, wherein said calcined mixed metal oxide hydrotalcite-like compound comprises at least one bivalent metal ($M^{2+}$) and at least one trivalent metal ($M^{3+}$), and wherein:

said at least one bivalent metal ($M^{2+}$) is selected from the group consisting of $Co^{2+}$, $Cu^{2+}$, $Fe^{2+}$, $Mn^{2+}$, $Zn^{2+}$, $Ni^{2+}$, $Ag^{2+}$, $Ca^{2+}$, $Pt^{2+}$; $Pd^{2+}$; $Cd^{2+}$; $Mo^{2+}$; $W^{2+}$; $Ru^{2+}$; $Sr^{2+}$; $Ba^{2+}$; $Nd^{2+}$ and mixtures thereof, and wherein said at least one trivalent metal ($M^{3+}$) is selected from the group consisting of $Ce^{3+}$, $Al^{3+}$, $Mn^{3+}$, $Fe^{3+}$, $Hf^{3+}$, $Co^{3+}$, $V^{3+}$, $Ti^{3+}$, $Zr^{3+}$, $Y^{3+}$, $La^{3+}$ and $Pr^{3+}$ and mixtures thereof; or wherein said at least one trivalent metal ($M^{3+}$) in combination with $Al^{3+}$ is selected from the group consisting of $Ce^{3+}$, $Mn^{3+}$, $Fe^{3+}$, $Hf^{3+}$, $Co^{3+}$, $V^{3+}$, $Ti^{3+}$, $Zr^{3+}$, $Y^{3+}$, $La^{3+}$ and $Pr^{3+}$ and mixtures thereof; and wherein said catalysator element provides conversion of isocyanic acid to $NH_3$ via at least one of hydrolysis and conversion of urea to $NH_3$.

2. The catalysator element according to claim 1, wherein at least one bivalent metal ($M^{2+}$) and said at least one trivalent metal ($M^{3+}$) are selected from the group of non-stoichiometric combinations consisting of CoAlCe; CoAlMn; CoAlFe; CoAlCo; CoAlV; CoAlTi; CoAlHf; CoAlPr; CoAlLa; CuAlCe; FeAlCe; ZnAlCe; NiAlCe; AgAlCe; CaAlCe; PtAlCe; PdAlCe; CdAlCe; MoAlCe; WAlCe; RuAlCe; SrAlCe; BaAlCe; NdAlCe; CuAlMn; FeAlMn; ZnAlMn; NiAlMn; AgAlMn; CaAlMn; PtAlMn; PdAlMn; CdAlMn; MoAlMn; WAlMn; RuAlMn; SrAlMn; BaAlMn; NdAlMn; CuAlFe; FeAlFe; ZnAlFe; NiAlCe; AgAlCe; CaAlCe; PtAlCe; PdAlCe; CdAlCe; MoAlCe; WAlCe; RuAlCe; SrAlCe; BaAlCe; NdAlCe; CuAlCo; FeAlCo; ZnAlCo; NiAlCo; AgAlCo; CaAlCo; PtAlCo; PdAlCo; CdAlCo; MoAlCo; WAlCo; RuAlCo; SrAlCo; BaAlCo; NdAlCo; CuAlV; FeAlV; ZnAlV; NiAlV; AgAlV; CaAlV; PtAlV; PdAlV; CdAlV; MoAlV; WAlV; RuAlV; SrAlV; BaAlV; NdAlV; CuAlTi; FeAlTi; ZnAlTi; NiAlTi; AgAlTi; CaAlTi; PtAlTi; PdAlTi; CdAlTi; MoAlTi; WAlTi; RuAlTi; SrAlTi; BaAlTi; NdAlTi; CuAlHf; FeAlHf; ZnAlHf; NiAlHf; AgAlHf; CaAlHf; PtAlHf; PdAlHf; CdAlHf; MoAlHf; WAlHf; RuAlHf; SrAlHf; BaAlHf; NdAlHf; CuAlPr; FeAlPr; ZnAlPr; NiAlPr; AgAlPr; CaAlPr; PtAlPr; PdAlPr; CdAlPr; MoAlPr; WAlPr; RuAlPr; SrAlPr; BaAlPr; NdAlPr; CuAlLa; FeAlLa; ZnAlLa; NiAlLa; AgAlLa; CaAlLa; PtAlLa; PdAlLa; CdAlLa; MoAlLa; WAlLa; RuAlLa; SrAlLa; BaAlLa; and NdAlLa.

3. The catalysator element according to claim 2, wherein at least one bivalent metal ($M^{2+}$) and said at least one trivalent metal ($M^{3+}$) are selected from the group of combinations consisting of CoAlCe; CoAlMn; CoAlFe; CoAlCo; CoAlV; CoAlTi; CoAlPr; CoAlLa; CuAlCe; FeAlCe; ZnAlCe; NiAlCe; AgAlCe; CaAlCe; PtAlCe; PdAlCe; CdAlCe; MoAlCe; RuAlCe; SrAlCe; BaAlCe; NdAlCe; PdAlMn; RuAlMn; CdAlCe; MoAlCe; WAlCe; RuAlCe; CuAlCo; FeAlCo; ZnAlCo; NiAlCo; CdAlCo; MoAlCo; WAlCo; RuAlCo; NdAlCo; CuAlPr; FeAlPr; NiAlPr; AgAlPr; CaAlPr; CdAlPr; CuAlLa; FeAlLa; NiAlLa; AgAlLa; CaAlLa; CdAlLa; MoAlLa; WAlLa; SrAlLa; BaAlLa; and NdAlLa.

4. The catalysator element according to claim 1, wherein said calcined mixed metal oxide hydrotalcite-like compound is obtained by calcining a mixed metal oxide hydrotalcite-like compound comprising at least one bivalent metal ($M^{2+}$) and at least one trivalent metal ($M^{3+}$) at a temperature of between 200° C. to 600° C., for at least 1 hour.

5. The catalysator element according to claim 1 wherein said solid support is a metallic support or a ceramic support either zone coated or fully coated.

6. The catalysator element according to claim 1, wherein said catalysator element is comprised in an exhaust system of a combustion engine or said catalysator element is comprised in a system that guides exhaust gases of a combustion engine.

7. The catalysator element according to claim 1, wherein said calcined mixed metal oxide hydrotalcite-like compound has a catalytic surface area of at least 80 $m^2/g$.

8. The catalysator element according to claim 1, wherein said calcined mixed metal oxide hydrotalcite-like compound has an average pore diameter of at least 4 nm.

9. The catalysator element according to claim 1, wherein said at least one bivalent metal ($M^{2+}$) has an atomic radius ranging from 0.3 Å to 1.05 Å, and wherein said at least one trivalent metal ($M^{3+}$) has an atomic radius ranging from 0.5 Å to 1.1 Å.

10. The catalysator element according to claim 1, wherein said calcined mixed metal oxide hydrotalcite-like compound has an urea to $NH_3$ conversion rate of at least 50% at a temperature below 125° C.

11. The catalysator element according to claim 1, wherein said calcined mixed metal oxide hydrotalcite-like compound has a total metal wt % ratio of $M^{2+}$ to $M^{3+}$ of between 0.05 and 0.8.

12. The catalysator element according to claim 1, wherein said calcined mixed metal oxide hydrotalcite-like compound is comprised of a total metal wt % between 50 to 90 wt % of $Co^{2+}$, between 4 to 30 wt % of $Ce^{3+}$ and between 2 to 30 wt % of $Al^{3+}$.

13. The catalysator element according to claim 1, wherein said calcined mixed metal oxide hydrotalcite-like compound is $Co_6Ce_{0.8}Al_{1.2}O_9$.

14. The catalysator element according to claim 1 wherein said solid support is selected from the list consisting of metal wiremesh, corrugated metal plates forming a metal substrate, ceramic mixers or other ceramic components guiding or influencing the flow, ceramic substrates, and substrates for SCR, SCRF or DPNR.

15. A method for the preparation of a calcined mixed metal oxide hydrotalcite-like compound according to claim 1, wherein the method comprises;

a) mixing of at least one bivalent metal nitrite ($M^{2+}(NO_3)_x$) with at least one trivalent metal nitrite ($M^{3+}(NO_3)_x$) in an ammonium carbonate solution ($NH_4CO_3$), b) precipitating a mixed metal oxide hydrotalcite-like compound from the mixture, c) recovering the mixed metal oxide hydrotalcite-like compound by drying, and calcining the dried mixed metal oxide hydrotalcite-like compound at between 200° C. to 600° C., for at least 1 hour.

16. The method according to claim 15, wherein the calcined mixed metal oxide hydrotalcite-like compound is $Co_6Ce_{0.8}Al_{1.2}O_9$.

17. A calcined mixed metal oxide hydrotalcite-like compound obtainable by a method according to claim 15.

18. An exhaust system for a combustion engine or a system that guides exhaust gases of a combustion engine comprising a catalysator element according to claim 1.

19. A method for conversion of nitrogen oxides (NOx) in exhaust gasses comprising contacting said exhaust gasses with a catalysator element according to claim 1 during a sufficient time for allowing catalytic conversion of nitrogen oxides (NOx) comprising contacting urea with the catalysator element to generate $NH_3$, followed by reduction of NOx with $NH_3$ over a SCR catalysator element.

20. A method for prevention of the formation of deposits including cyanuric acid downstream of an SCR catalyst or an SCRF catalyst including in the EGR system comprising contacting isocyanic acid with a catalysator element according to claim 1 thereby preventing the formation of cyanuric acid.

21. Method for conversion of urea $(NH_2)_2CO$ into ammonia $(NH_3)$ comprising contacting said urea with a catalysator element according to claim 1 during a sufficient time for allowing catalytic conversion of urea into ammonia.

22. Method of decomposing urea deposits in an exhaust system by contacting the deposits with a catalysator element according to claim 1 and by increasing the temperature over 140° C.

* * * * *